United States Patent [19]

Hattori et al.

[11] Patent Number: 5,713,111
[45] Date of Patent: Feb. 3, 1998

[54] METHOD FOR MAKING AN INTERENGAGING FASTENER HAVING REDUCED ENGAGEMENT FORCE

[75] Inventors: Jiro Hattori, Atsugi; Shinji Torigoe, Sagamihara; Norihito Shibahara, Hachioji; Osamu Sawajiri, Sagamihara, all of Japan

[73] Assignee: Minnesota Mining and Manufacturing Company, St. Paul, Minn.

[21] Appl. No.: 787,789

[22] Filed: Jan. 23, 1997

Related U.S. Application Data

[62] Division of Ser. No. 588,620, Jan. 19, 1996, Pat. No. 5,671,512, which is a continuation of Ser. No. 281,463, Jul. 27, 1994, abandoned.

[51] Int. Cl.$^6$ ............................. A44B 18/00; B29C 45/32
[52] U.S. Cl. .............................. 24/452; 24/442; 264/167; 264/173.1; 264/145
[58] Field of Search ........................ 24/306, 442–452, 24/575–576; 264/167, 173.1, 141, 145, 151, 318; 428/100

[56] References Cited

U.S. PATENT DOCUMENTS

| | | | |
|---|---|---|---|
| 3,192,589 | 7/1965 | Pearson | 24/204 |
| 3,266,113 | 8/1966 | Flanagen, Jr. | 24/204 |
| 3,320,649 | 5/1967 | Naimer | 28/72 |
| 3,537,946 | 11/1970 | Truax et al. | 161/66 |
| 3,773,580 | 11/1973 | Provost | 156/66 |
| 3,808,648 | 5/1974 | Billarant et al. | 24/204 |
| 3,849,840 | 11/1974 | Yamada et al. | 24/204 |
| 3,851,357 | 12/1974 | Ribich et al. | 24/73 P |
| 3,899,803 | 8/1975 | Brumlik | 24/204 |
| 3,916,055 | 10/1975 | Wagner | 428/161 |
| 4,001,366 | 1/1977 | Brumlik | 264/145 X |
| 4,056,593 | 11/1977 | de Navas Albareda | 264/145 |
| 4,147,580 | 4/1979 | Buell | 156/291 |
| 4,169,303 | 10/1979 | Lemelson | 24/204 |
| 4,216,257 | 8/1980 | Schams et al. | 428/93 |
| 4,322,875 | 4/1982 | Brown et al. | 24/204 |
| 4,454,183 | 6/1984 | Wollman | 428/92 |
| 4,726,975 | 2/1988 | Hatch | 428/100 |
| 4,794,028 | 12/1988 | Fischer | 24/442 |
| 4,814,036 | 3/1989 | Hatch | 156/245 |
| 4,819,309 | 4/1989 | Behymer | 24/576 |
| 4,894,060 | 1/1990 | Nestgard | 604/391 |
| 4,933,224 | 6/1990 | Hatch | 428/100 |
| 4,984,339 | 1/1991 | Provost et al. | 24/452 |
| 5,040,275 | 8/1991 | Eckhardt et al. | 24/447 |
| 5,067,210 | 11/1991 | Kayaki | 24/452 |
| 5,100,400 | 3/1992 | Mody et al. | 604/391 |
| 5,140,727 | 8/1992 | Dais et al. | 24/587 |
| 5,149,573 | 9/1992 | Kobe et al. | 428/93 |
| 5,179,767 | 1/1993 | Allan | 24/452 |
| 5,201,101 | 4/1993 | Rouser et al. | 24/575 |
| 5,212,853 | 5/1993 | Kaneko | 24/452 |

(List continued on next page.)

FOREIGN PATENT DOCUMENTS

| | | |
|---|---|---|
| 0 258 015 | 3/1988 | European Pat. Off. . |
| 1350009 | 4/1974 | United Kingdom . |
| 1510558 | 10/1978 | United Kingdom . |

*Primary Examiner*—James R. Brittain
*Assistant Examiner*—Robert J. Sandy
*Attorney, Agent, or Firm*—Charles D. Levine

[57] ABSTRACT

To provide an interengaging fastener member which can enhance the disengagement force, while does not increase an engagement force required for an interengagement process. The fastener member 10 includes a base 12 and a plurality of headed stems 14. Each headed stem 14 includes a stem 16 adjoining and projecting orthogonally from the surface of base 12, and a head 18 formed at the end of the stem 16. The head 18 is provided with a bottom surface 20 adjacent to the stem 16 and extending outward from outer periphery of the stem 16, and an apex 24 arranged at an opposite side of the bottom surface 20 from the stem 16. The engagement force reducing means may take the form of, for example, one or more grooves formed in each head, or an undercut formed in each headed stem in the area where the head adjoins the stem.

9 Claims, 4 Drawing Sheets

U.S. PATENT DOCUMENTS

| | | | |
|---|---|---|---|
| 5,242,646 | 9/1993 | Torigoe et al. | 264/318 X |
| 5,260,015 | 11/1993 | Kennedy et al. | 264/167 |
| 5,384,939 | 1/1995 | Weber | 24/306 |
| 5,398,387 | 3/1995 | Torigoe et al. | 24/442 |
| 5,460,769 | 10/1995 | Kaneko | 264/318 |
| 5,579,562 | 12/1996 | Hattori et al. | 24/452 |
| 5,598,610 | 2/1997 | Torigoe et al. | 24/444 |
| 5,607,635 | 3/1997 | Melbye et al. | 264/167 |
| 5,611,122 | 3/1997 | Torigoe et al. | 24/442 |
| 5,625,929 | 5/1997 | Hattori et al. | 24/452 |
| 5,628,097 | 5/1997 | Benson et al. | 264/145 X |

METHOD FOR MAKING AN INTERENGAGING FASTENER HAVING REDUCED ENGAGEMENT FORCE

This is a division of application Ser. No. 08/588,620, filed Jan. 19, 1996, now U.S. Pat. 5,671,512, which is a continuation of application Ser. No. 08/281,463, filed Jul. 27, 1994 (abandoned).

TECHNICAL FIELD

The present invention relates to an interengaging fastened member of the type typically engaged with an opposed fastener member.

BACKGROUND OF THE INVENTION

One type of fastener includes two substantially identical fastener members, each of which has a plurality of headed stems adjoining and projecting from a base as shown in FIG. 8. To interengage the fastener members, the headed stems are opposed with the respective bases substantially parallel to each other, and a compressive force is applied to the bases to interengage the headed stems. The force required to engage the fastener members is less than the force required to disengage the fastener members, which permits the components to which the fastener members are attached to be easily and securely attached. The cost of producing matching fastener members is often less than the cost of producing male and female fastener members, which is also advantageous.

A conventional fastener of the type described above is illustrated in FIG. 8. This fastener includes a first fastener member 1 and a second fastener member 2, each of which is a unitary molded polymeric body. The first and second fastener members are provided with generally flat bases 3 and 4, respectively, and a plurality of headed stems 5 which are arranged on the bases in a predetermined spaced relationship. Each of the headed stems 5 includes a stem 6 projecting generally orthogonally from bases 3 and 4, and a head 7 formed at the end of the stem 6. The diameter of the head at at least one point is greater than the diameter of stem 6. The head 7 of each headed element 5 has a generally flat bottom surface 8 adjacent stem 6 and extending radially outward from the periphery of stem 6. Each head also includes a apex 9, positioned opposite the stem 6 relative to the bottom surface 8.

The first fastener member 1 and the second fastener member are positioned so that bases 3 and 4 are arranged substantially parallel to each other with the headed stems 5 thereof being mutually opposed as shown in FIG. 8(a). When the fastener members are compressively engaged as described above, the head 7 of the headed stem 5 of one fastener member comes into contact with and slides against the heads 7 of the headed stems 5 of the other fastener member. The stems of each fastener member bend to permit the heads 7 to bypass each other and thus to enter the space between the opposed stems 6, as shown in FIG. 8(b). In this position, the headed stems 5 of one fastener member are engaged at the bottom surfaces 8 with the bottom surfaces 8 of the heads 7 of the other fastener member. In this manner, the first fastener member 1 and the second fastener member 2 are attached to each other.

For some fastening applications, it is important to maximize the disengagement force necessary to disengage the fastener members from each other. Accordingly, fasteners for such applications have been modified to increase the disengagement force, and those modifications have included increasing the size of the heads on each headed stem to increase a friction caused between the bottom surfaces of the mutually engaged heads. Another modification involved providing two or more stems attached to each head, to reduce the flexibility of the headed stem and thereby increase the disengagement force of the fastener.

Although the modified fasteners described above display an increased disengagement force, the force required to engage the fastener members was also increased. The increased engagement force can damage the headed stems, possibly resulting in lower, rather than higher, disengagement force. Also, if the fastener members are engaged and disengaged repeatedly, the headed stems may become worn, also resulting in reduced disengagement force. Thus, it is desirable to provide an interengaging fastener including two faster members that demonstrate a disengagement force that is larger than conventional fasteners of a similar type, but demonstrate an engagement force that is not substantially larger than conventional fasteners.

BRIEF DESCRIPTION OF THE DRAWINGS

The present invention will be further explained with reference to the appended Figures, wherein like structure is referred to by like numerals throughout the several views, and wherein.

SUMMARY OF THE INVENTION

An interengaging fastener member is provided according to the present invention, comprising a base, a plurality of headed stems arranged on said base in a predetermined spaced relationship, each of said headed stems including a stem adjoining and projecting from said base, and a head connected to a distal end of said stem, and engagement force reduction means for enabling at least a portion of said headed stems to resiliently deflect to facilitate interengagement of said fastener member with an opposed, like fastener member. In one embodiment, the engagement force reduction means comprises a hollow portion formed adjacent said stem by a surface of said head. In another embodiment, the engagement force reduction means comprises at least one groove extending through said head.

In another embodiment, the interengaging fastener member is formed as a unit by injection molding with a destructible stem mold.

DETAILED DESCRIPTION OF THE INVENTION

The interengaging fastener member of the present invention includes a base, a plurality of headed stems, and means for reducing the force required to engage the fastener member with an opposed, like fastener member. The engagement force reducing means facilitates resilient deflection of the head, when the opposed heads of the headed stems of counterpart fastener member are inserted into space between the stems of the adjacent headed stems. Therefore, even if the disengagement force of the fastener is enhanced by enlarging the head size or by reducing the elasticity of the stem(s), the engagement force is not increased, due to the deflection of the head.

Figure 1:
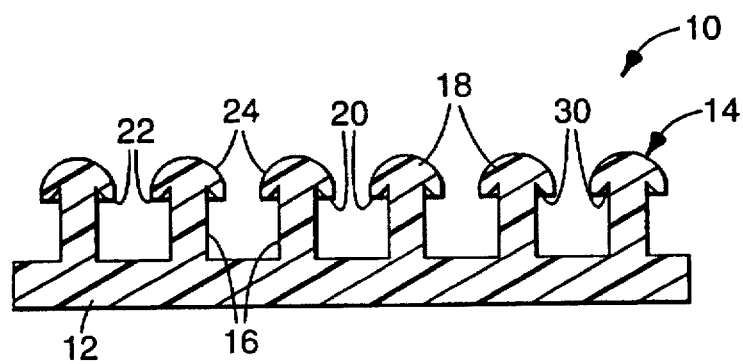
FIG. 1 is a vertical sectional view of an interengaging fastener member according to one embodiment of the present invention.

FIG. 1 shows an interengaging fastener member 10 according to one embodiment of the present invention. The fastener member 10 is molded preferably of a polymeric material as a unitary body, and includes a generally flat base 12 and a plurality of headed stems 14 arranged on the base 12 in a predetermined spaced relationship. The headed stems may be arranged in aligned rows and columns, sinusoidal columns, offset columns, random positions, or any other suitable arrangement. Each headed stem 14 is provided with a stem 16 projecting substantially orthogonally from the surface of the base 12, and a head 18 is connected to the distal end of the stem. The head has a diameter that, at at least one point, is greater than the diameter of the stem. Variations on the foregoing fastener design are intended to be within the scope of the present invention, including fasteners having non-planar bases, non-linear stems, stems that project from the base at an angle, and the like.

Figure 2:
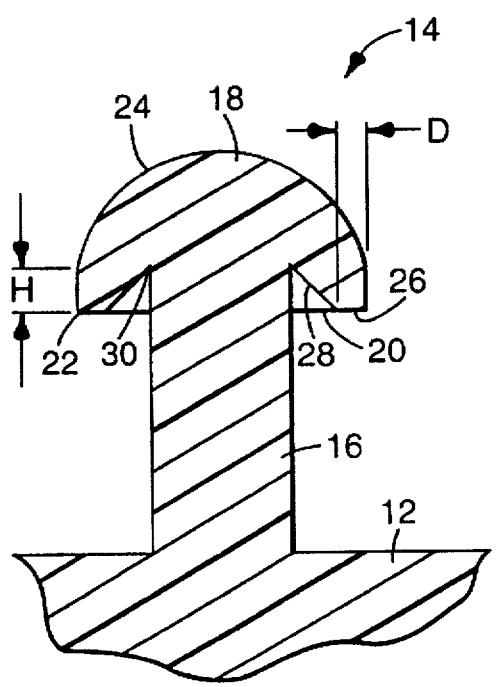
FIG. 2 is an enlarged sectional view of a headed stem of the fastener member shown in FIG. 1.

As shown in an enlarged manner in FIG. 2, the head 18 of the headed stem 14 includes a bottom surface 20 adjacent to the stem 16 and extending outward from the periphery of the stem 6, and a curved apex 24 extending from a peripheral edge 22 of the bottom surface 20, and terminating at an opposite side of the bottom surface 20 from the stem 16. The headed stem shown in FIG. 2 differs from conventional headed stems in that the head is "undercut," meaning that a portion of the head between the peripheral edge and the stem has been removed to increase the flexibility of the head. The bottom surface 20 of the head 18 includes a horizontal section 26 that extends generally parallel to the surface of the base 12 toward center from the peripheral edge 22 so as to encircle the stem 16, and a slanted section 28 extends from the inner edge of the horizontal section 26 toward the apex 24 and adjoins the peripheral surface of the stem 16. According to such a shape of the bottom surface 20, an undercut 30 is formed in the head 18 at the side thereof facing the base 12 so as to surround the upper end section of the stem 16. The head 18 has an umbrella shape with a generally hemispherical contour, as illustrated, which is defined by the bottom surface 20 and the top surface 24, and the central portion of the bottom surface 20 is fixed to the upper end of the stem 16. The contour of the head 18 should not be restricted to the illustrated shape, but may adopt various shapes, such as a bullet shape having larger height.

The head 18 of the headed stem 14 is sized so that a maximum projected diameter on a given plane parallel to the horizontal section 26 of the bottom surface 20 is, for example, between 0.5 mm and 4.0 mm. Also, a radial distance D of the horizontal section 26 of the bottom surface 20 is preferably in a range of 0.1 mm through 0.6 mm, and an area of opening-plane of the undercut 30 depends on the radial distance. The height of the undercut 30, indicated as "H" in FIG. 2, may be selected so that the slant section 28 does not reach the top surface 24 of the head 18. In the illustrated embodiment, the slant section 28 of the bottom surface 20 is substantially linear in cross-section, but could instead extend in a curved manner in cross-section.

In the fastener member 10, when the heads of the headed stems of an opposed, like fastener member are inserted into space between the stems 16 of the adjacent headed stems 14, the head 18 of the headed stem 14 resiliently deflects due to the undercut 30 formed in the head 18. In this case, the head 18 is more readily deflected when a pressure is applied in a direction from the top surface 24 to the bottom surface 20 (engagement), than when a pressure is applied in a direction from the bottom surface 20 to the top surface 24 (disengagement). Accordingly, even though the maximum projected diameter of the head 18 is enlarged or the elasticity of the stem 16 is reduced for the purpose of enhancing the disengagement force of the fastener using the fastener member 10, it is possible to prevent the engagement force from increasing because of the undercut 30, and the engagement force may be reduced if the dimensions of the undercut 30 are properly selected. Also, due to the function of the undercut 30, it may be possible to reduce the engagement force while maintaining the disengagement force at the constant level. Further, it is also possible to control the wear or abrasion of the head 18 of the headed stem 14 during the interengagement procedure.

Figure 3:
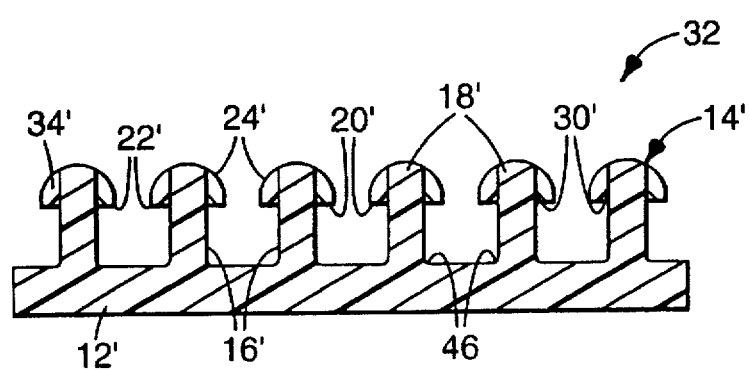
FIG. 3 is a vertical sectional view of an interengaging fastener member according to another embodiment of the present invention.
Figure 4:
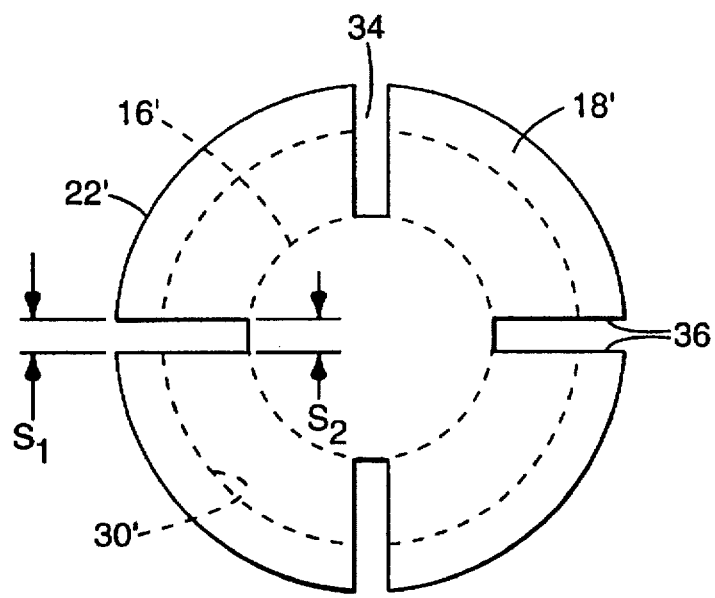
FIG. 4 is an enlarged plan view of a headed stem of the fastener member shown in FIG. 3.
Figure 5:
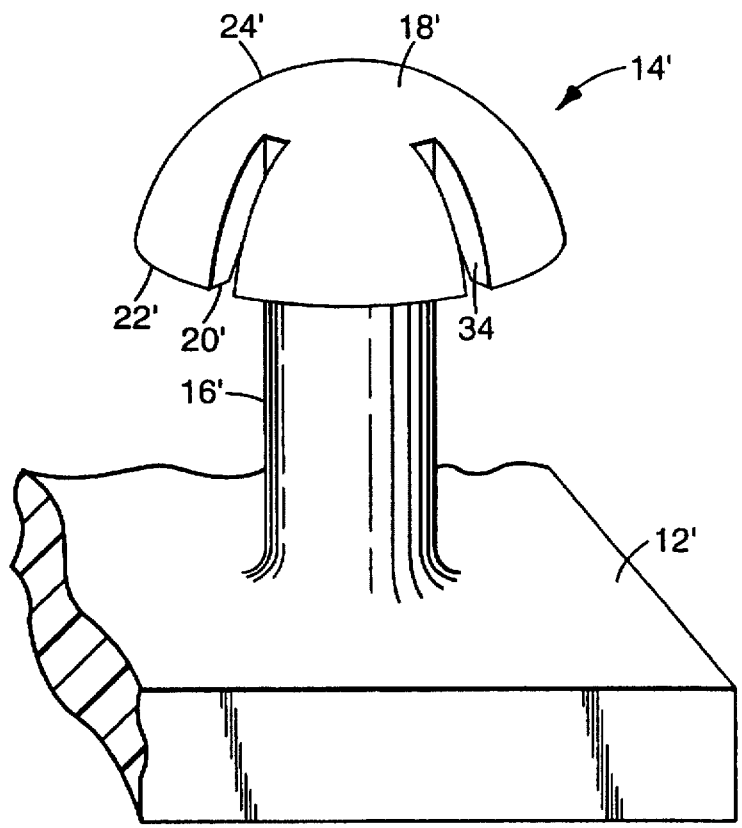
FIG. 5 is an enlarged perspective view of the headed stem of the fastener member shown in FIG. 3.

FIG. 3 shows an interengaging fastener member 32 according to another embodiment of the present invention. The fastener member 32 has headed stems 14', similar to those shown in FIG. 1, each of which has a head 18' provided with grooves 34 extending through the head 18' between a bottom surface 20' and a top surface 24'. As shown in FIGS. 4 and 5, each groove 34 extends from the peripheral edge 22' of the bottom surface 20' to a connection between the bottom surface 20' and the stem 16', by opposed walls 36 linearly extending in the radial direction substantially parallel to each other. The groove 34 enhances the deflection of the head 18' in association with the undercut 30', and assists the engagement force reduction effect.

Figure 6A:
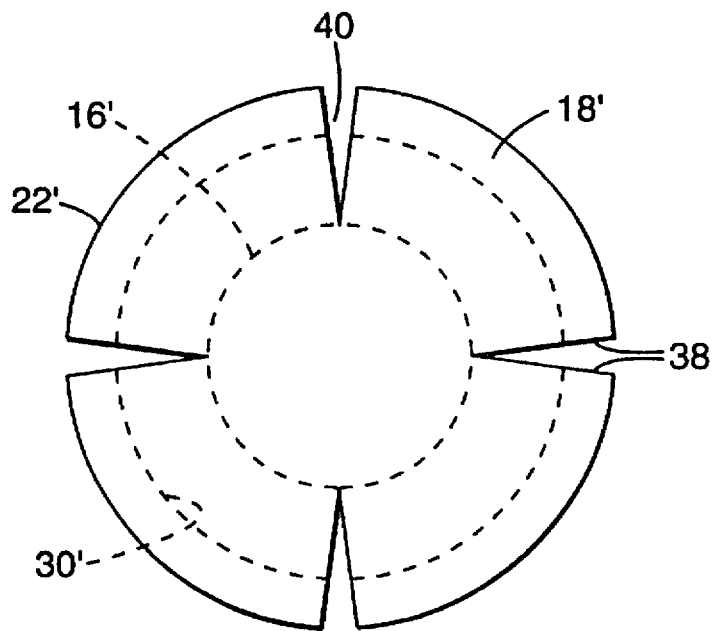
FIGS. 6(a) and 6(b) are plan views of modified headed stems of the type shown in FIG. 4.
Figure 6B:
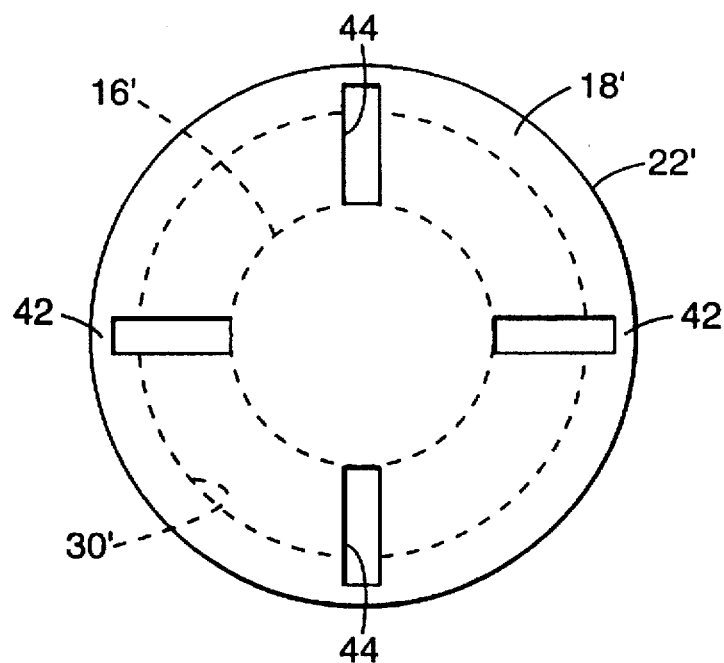

To prevent the disengagement force of the fastener from being lower than the engagement force, it is preferred that not more than five grooves 34 are provided in each head 18'. The width of the groove 34 is preferably between 0.05 mm and 0.5 mm, at the peripheral edge 22' (width S1) and at the inner edge (width S2). Moreover, as shown in FIG. 6, it may be possible to provide other shaped grooves in the head 18', such as a groove 40 defined by opposed walls 38 extending in a radially tapered manner from the peripheral edge 22' of the bottom surface 20' (FIG. 6(a)), or a groove 44 having no opening at the peripheral edge 22' of the bottom surface 20' and having a rib 42 extending between the bottom surface 20' and the top surface 24' (FIG. 6(b)).

In the embodiment shown in FIG. 3, a connecting section between a base 12' and each headed stem 14' of the fastener member 32 is formed as a radiused corner 46. The radiused corner 46 reduces stress generated by the deflection of the stem 16' of the headed stem 14' at the interface between the stem and the base, whereby the durability of the fastener member 32 can be improved.

Figure 7:
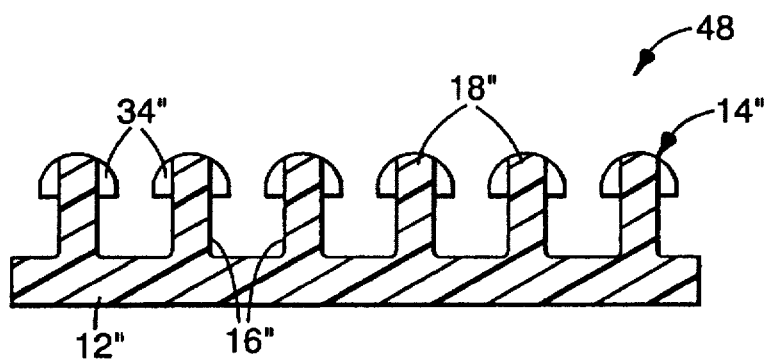
FIG. 7 is a vertical sectional view of an interengaging faster member according to further embodiment of the present invention.
Figure 8A:
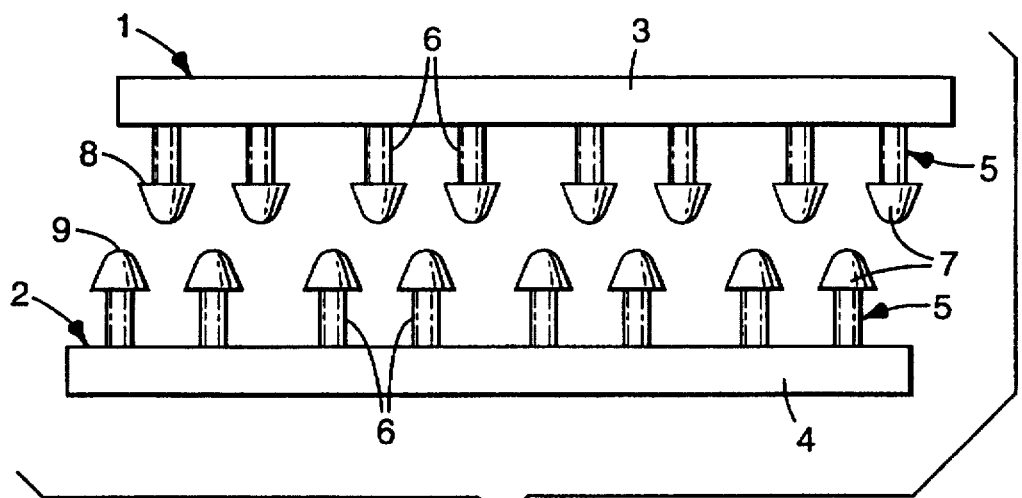
FIGS. 8(a) and 8(b) are schematic side views of a conventional fastener having a pair of interengaging fastener members before and after interengagement, respectively.
Figure 8B:
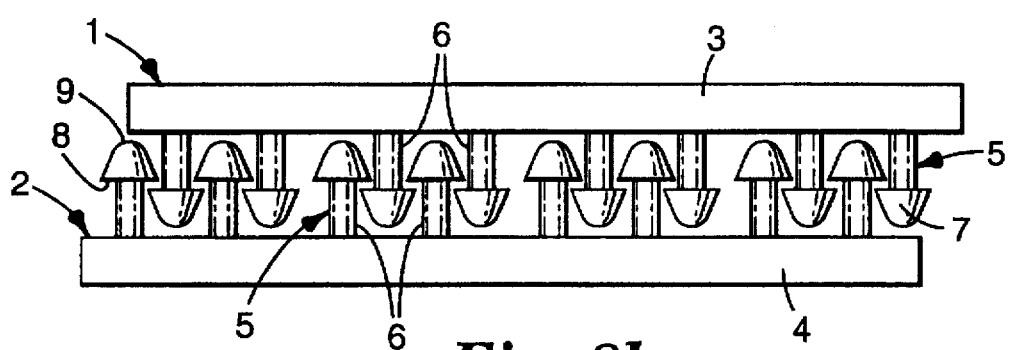

FIG. 7 shows an interengaging fastener member 48 according to a further embodiment of the present invention. The fastener member 48 includes headed stems 14", a head 18" of each headed stem 14" being provided only with grooves 34". In the fastener member 48, it is also possible to obtain the engagement force reduction effect, because the grooves 34" enhance the deflection of the head 18" of the headed stem 14".

In the above embodiments, the fastener members 10, 32, 48 may have any shapes and dimensions. For example, the base 12 may be formed with shapes and dimensions which enable the base to fixedly hold the headed stems 14. Also, the base 12 may be provided with fixing means, such as a hook or a threaded shaft provided on the base surface opposite the headed stems, for fixing the fastener member to the object to be fastened. Alternatively, the fastener member can be fixed to the surface of the object through, for example, a layer of pressure sensitive adhesive.

The stem 16 of the headed stem 14 may be formed in various shapes, such as a cylinder, a prism, or a frustum, and more than two stems 22 may be provided for each headed stem. It is preferred that the connection between the bottom surface 20 and the top surface 24 at the peripheral edge 22 of the head 18 is provided with no acute angular section, so as to reduce scratch noise when the head 18 is engaged with the head of the counterpart headed stem.

In the above embodiments, the fastener members 10, 32, 48 may be made of any suitable material. For example, polymeric materials such as polyamide resin, polyester resin, polypropylene resin, or polyethylene resin are used for the base 12. Particularly, polyamide resin is one of the most suitable materials because of the superiority thereof in heat resistance, mechanical strength, and injection molding aptitude. The bending modulus of elasticity of the materials can be optionally modified or changed in such a manner as adding plasticizer and filler. When woven or non-woven fabric is used, the fastener members can obtain suitable flexibility. If the back surface of the base is provided with a metal layer, it is possible to obtain a ground to the attached object, and to improve adherence when being fixed to the object by adhesive.

The headed stem 14 may be made of the same polymeric material as that of the base 12. Particularly, the head 18 is preferably made of a material having a bending modulus of elasticity in a range of $10^3$ kgf/cm$^2$ through $10^5$ kgf/cm$^2$ according to a measurement based on ASTM test method D790. Also, the base 12 and the stems 16 of the headed stems 14 may be made of a high-strength material different from that of the head 18, for improving a durability of the fastener member 10.

The interengaging fastener member according to the present invention preferably has an engagement force of between 0 5 kgf/cm$^2$ and 8.0 kgf/cm$^2$, and more preferably of between 0.5 kgf/cm$^2$ and 3.5 kgf/cm$^2$, and a disengagement force of between 1.5 kgf/cm$^2$ and 8.0 kgf/cm$^2$ but larger than the engagement force.

Fastener members 10, 32, and 48 may be formed by any suitable method. For example, it is possible to provide the undercut 30 or groove 34 by machining a conventional fastener member with headed stems, which fastener member has been formed by an injection or extrusion molding process. A preferred molding process is that of integrally molding the base and the headed stems by injection molding using a destructible stem mold. An exemplary injection molding process that uses a destructible stem mold is described in U.S. Pat. No. 5,242,646 (Torigoe et al.), the contents of which is incorporated herein by reference. In this regard, the destructible stem mold is a general term for a mold which is used as a core in a metal mold and which can be removed by, for example, ultrasonic vibration, melting, water or solvent dissolution, or disintegration. In this case, the destructible stem mold is used as a mold for stems of the headed stems and for the undercut or groove or both formed in the head, and, after integrally molding the stems with the base and the heads of the headed stems, the destructible stem mold may be removed by a suitable mechanical or chemical method. Alternatively, the destructible stem mold may be used as a mold only for stems, and the undercut or groove or both may be molded by a suitable metal mold.

The present invention will be described in further detail with respect to the following Examples, which are intended to be illustrative rather than predictive or limiting.

EXAMPLES

Test One: Engagement Force

The compressive force required to engage two headed stem fastener members with each other was measured by an Autograph type tester, while compressing both fastener members in a mutually approaching direction at a compression speed of 100 mm/min. The engagement force for each of eight sample fasteners is listed in Table One below.

Test Two: Disengagement Force

The tensile force forces required for disengaging the engaged headed stem fastener members from each other was measured by an Autograph type tester, while pulling both fastener members axially apart at a stretching speed of 100 mm/min. The disengagement force for the eight sample fasteners tested in Test One is listed in Table One below.

These experiments were carried out on various fasteners having fastener members of the same shape, each headed stem of which is provided with undercut or grooves of various dimensions or both, and has a head with a maximum projected diameter of 1.8 mm. The undercut has a shape as shown in FIG. 1, and there were four grooves in each head. The fastener members were made of a polyamide resin having a bending modulus of elasticity of $4 \times 10^4$ kgf/cm$^2$. The results are listed in Table One below, wherein sample number 1 is a conventional fastener and sample numbers 2 through 8 include means for reducing the engagement force in accordance with the present invention.

TABLE 1

| Sample Number | Recessed Section | | Notch | | Engagement | Disengagement |
| --- | --- | --- | --- | --- | --- | --- |
| | D (mm) | H (mm) | S1 (mm) | S2 (mm) | Force (kgf/cm$^2$) | Force (kgf/cm$^2$) |
| 1 | — | — | — | — | 7.5 | 8.0 |
| 2 | 0.1 | 0.2 | — | — | 6.0 | 8.0 |
| 3 | 0.2 | 0.4 | — | — | 5.0 | 7.0 |
| 4 | 0.3 | 0.4 | — | — | 6.0 | 8.0 |
| 5 | 0.2 | 0.4 | 0.4 | 0.4 | 3.0 | 4.0 |
| 6 | 0.2 | 0.4 | 0.3 | 0.2 | 3.5 | 5.0 |
| 7 | 0.2 | 0.4 | 0.2 | 0.2 | 4.0 | 7.0 |
| 8 | — | — | 0.2 | 0.2 | 5.0 | 5.5 |

As shown in Table One, the fastener members of the present invention provided with the undercut or grooves or both in the headed stem reduce the engagement force, in comparison with the conventional fastener member (sample number 1). Particularly, in the fastener member of sample numbers 2, 3, 4 and 7, the reduction of engagement force is significant relative to the deterioration of disengagement force.

As apparent from the above description, according to the present invention, in an interengaging fastener member having a plurality of headed stems, it is possible to reduce an engagement force necessary for mutually engaging the same with a counterpart fastener member, while maintaining the disengagement force. Therefore, the disengagement force can be enhanced without increasing the engagement force, thereby improving the performance of a fastener having the fastener members according to the present invention.

The present invention has been described with reference to several embodiments thereof. It will be apparent to those skilled in the art that many changes can be made in the embodiments described without departing from the scope of the invention. Thus, the scope of the present invention should not be limited to the structures described herein, but rather by the structures described by the language of the claims, and the equivalents of those structures.

We claim:

1. A method of making an interengaging fastener member, comprising the steps of:
   a) providing a base mold having a cavity for forming a base of the fastener member and a head mold having cavities for forming a plurality of heads;
   b) providing a destructible stem mold having a plurality of passageways therethrough for forming a plurality of stems;
   c) arranging said base mold, said stem mold, and said head mold such that molten material flowed into at least one of said molds will form a fastener member having a base, a plurality of stems, a head atop a distal end of each unitary stem, and means for reducing the engagement force required to engage the fastener member with an opposed, like fastener member wherein said means for reducing the engagement force comprises an undercut portion formed in a bottom surface of said head, said undercut portion being within an outer circumferential horizontal portion of said bottom surface of said head engagable with a corresponding outer circumferential horizontal portion on an opposing interengaging fastener member;
   d) forming the fastener member by flowing a molten material into one of the mods; and
   e) releasing the fastener member by removing the fastener member from the head and base molds, and by destructibly removing the fastener member from the stem mold.

2. The method of claim 1, wherein the step of destructibly removing the fastener member from the stem mold comprises the step of dissolving the stem mold with a solvent.

3. The method of claim 2, wherein the solvent comprises water.

4. The method of claim 1, wherein the step of destructibly removing the fastener member from the stem mold comprises at least one of melting the stem mold, ultrasonically destroying the stem mold, and crushing the stem mold.

5. The method of claim 1, wherein the stem mold is adapted to form the means for reducing the engagement force in the form of an undercut portion beneath each head and circumjacent each respective stem.

6. The method of claim 1, wherein the stem mold is adapted to form the means for reducing the engagement force in the form of at least one groove formed in each head.

7. A method of making an interengaging fastener member, having means for reducing the engagement force required to engage the fastener member with an opposed, like fastener member, comprising the steps of:
   a) providing an interengaging fastener member having a base, a plurality of headed stems adjoining said base and projecting orthogonally from the base, said headed stems including a unitary stem and a head adjoining a distal end of each stem; and
   b) machining into each headed stem means for reducing the engagement force wherein said means for reducing the engagement force comprises an undercut portion formed in a bottom surface of said head, said undercut portion being within an outer circumferential horizontal portion of said bottom surface of said head engagable with a corresponding outer circumferential horizontal portion on an opposing interengaging fastener member.

8. The method of claim 7, wherein step (b) comprises machining at least one groove into each head.

9. The method of claim 7, wherein step (b) comprises machining a undercut into each headed stem in the area where the head adjoins the stem.

* * * * *